Figure 1:
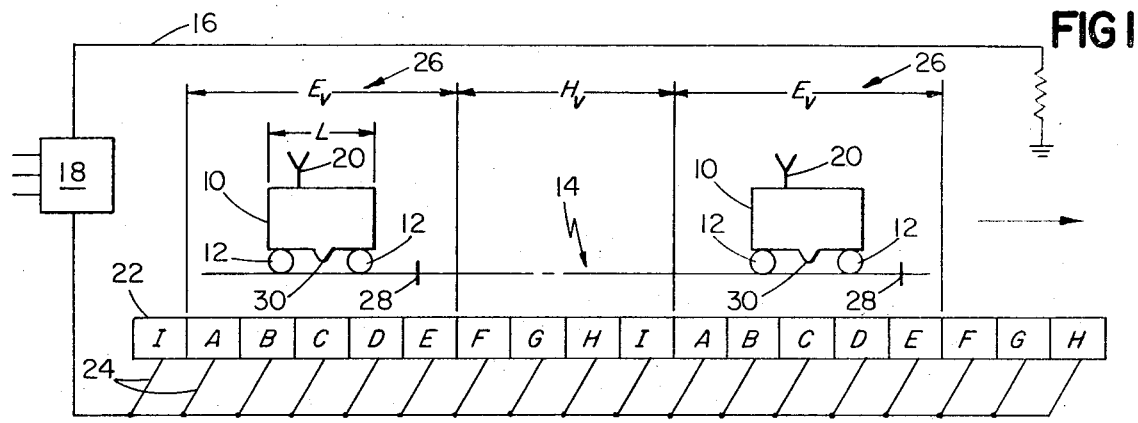

United States Patent
Morley et al.

[15] 3,681,597
[45] Aug. 1, 1972

[54] TRANSPORTATION SYSTEM

[72] Inventors: Richard E. Morley, Bedford; Eugene M. Weiss, Needham Heights; Robert R. Moline, Braintree; Michael P. Greenberg, Winchester, all of Mass.

[73] Assignee: Alden Self-Transit Systems Corporation, Bedford, Mass.

[22] Filed: June 1, 1970

[21] Appl. No.: 41,994

[52] U.S. Cl. ............................ 246/63 C, 246/187 B
[51] Int. Cl. .................................................. B61l 21/10
[58] Field of Search ... 246/182 B, 187 B; 235/92 MP; 318/632, 608

[56] References Cited

UNITED STATES PATENTS

| | | |
|---|---|---|
| 3,268,727 | 8/1966 | Shepard ...................... 246/187 B |
| 3,504,362 | 3/1970 | Feldmann ............ 246/182 B UX |
| 3,491,278 | 1/1970 | Stobbe .......................... 318/632 |
| 3,548,169 | 12/1970 | Togneri ..................... 235/92 MP |

Primary Examiner—Arthur L. La Point
Assistant Examiner—George H. Libman
Attorney—Willis M. Ertman

[57] ABSTRACT

A vehicle has propelling means for propelling the vehicle along a track, a digital-to-analog converter for producing propulsion control signals for application to the propelling means, means for applying digital propulsion control signals to the converter, and means for modifying applied digital signals as a function of signals representative of actual changes in vehicle position and signal representative of apparent changes in vehicle position.

15 Claims, 2 Drawing Figures

PATENTED AUG 1 1972 3,681,597

3,681,597

TRANSPORTATION SYSTEM

SUMMARY OF INVENTION

This invention relates generally to vehicle propulsion systems and in particular to a novel and improved system for propelling and controlling a plurality of vehicles which move on a track in synchronism in response to command pulses generated from a central computer.

In a transportation system of this type, it is desirable that a multiplicity of vehicles be under the control of a single computer. However, for a system of a given size, as the number of vehicles to be propelled synchronously increases, the possibility of collision increases correspondingly. Consequently the system should include provision for maintaining sufficient spacing between vehicles to prevent such occurrences. In addition, all of the vehicles may not receive the same number of command pulses since localized disorders— for example, noise or faulty equipment—may result in reception of spurious pulses or failure to receive actual pulses so that some vehicles may lead or lag others in the synchronous stream. Further, vehicle speeds may vary due to mechanical discrepancies in their individual propulsion systems. Consequently, localized position monitoring is desirable to minimize the variations of individual vehicle position from the desired locations in the stream. Preferably the system should monitor pulse reception and vehicle position continuously and automatically so that errors would not accumulate and so that human inputs to the system, which would entail additional expense and possible errors, may be avoided.

Accordingly, it is an object of the present invention to provide a novel and improved vehicle propulsion and control system which has a digital input for synchronously moving such vehicles along a track with apparatus that is efficient, reliable, inexpensive and compact.

Another object of the invention is to provide a novel and improved vehicle propulsion control system for automatic localized comparison of the actual position of vehicles in a synchronous stream with their apparent position and correction of apparent position accordingly.

A further object of the invention is to provide a novel and improved vehicle propulsion control system for automatic comparison of the number of command pulses actually received by a vehicle with the number of pulses transmitted by a command computer and for adjustment of vehicle position in accordance with any differences detected in the comparison.

A still further object of the invention is to provide highly responsive, non-polluting and inexpensive vehicle propulsion systems.

In one aspect the invention features a vehicle having propelling means for propelling the vehicle along a guideway, a digital-to-analog converter for producing propulsion control signals for application to the propelling means, means for applying digital propulsion control signals to the converter and means for modifying applied digital signals as a function of signals representative of actual vehicle position and signals representative of apparent changes in vehicle position.

In a preferred embodiment, the system includes means including a transducer and first comparison circuitry for modifying analog signals applied to the propelling means by the digital-to-analog converter as a function of analog signals representative of changes of position of the vehicle, and control means for modifying the analog signals produced by the converter to moderate the degree of response of the propelling means to the analog signals. A reversible counter responds to digital signals from a central command station and applies digital signals to the converter. The digital signals are modified by digital signals representative of apparent changes of vehicle position generated by an encoder and by signals representative of actual changes of vehicle position generated by track markers. First and second comparison circuitries compare, respectively, predetermined signal values with digital signals from the encoder and digital signals from the central command station, and periodically modify the count in the counter as a function of differences in those comparisons.

In a particular embodiment a hydraulic motor is arranged to drive the propulsion means, and responds to digital input signals via transducing means that converts the digital signals to appropriate analog values.

Figure 2:
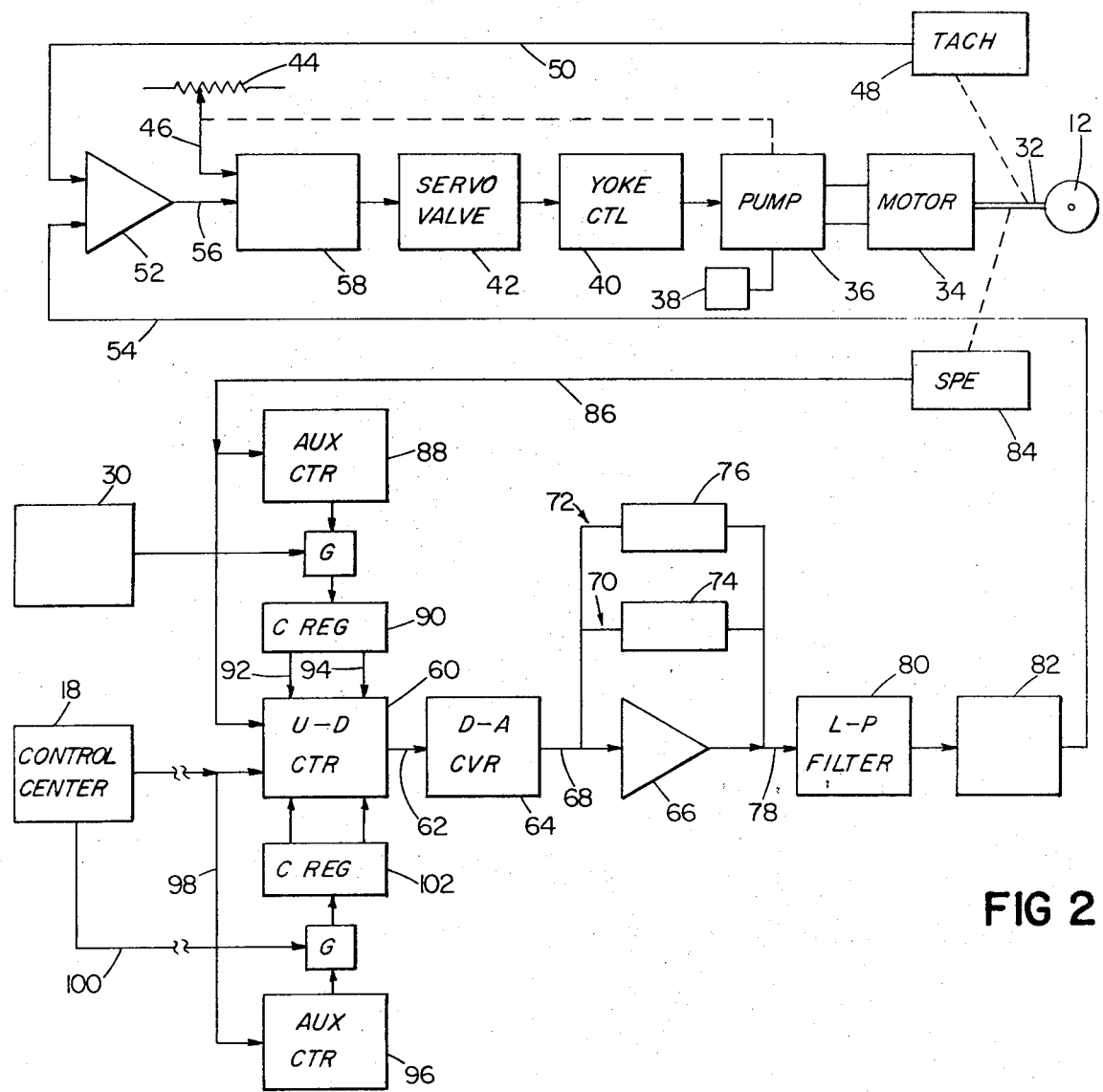

Other objects, features and advantages will become apparent from the following description of a preferred embodiment of the invention, taken together with the attached drawings thereof, in which:

FIG. 1 is a view, in side elevation, of two vehicles on a portion of the track of the system, together with a portion of the command and sensing circuitry; and FIG. 2 is a block diagram of a portion of a vehicle constructed in accordance with the invention.

DESCRIPTION OF PARTICULAR EMBODIMENT

Referring to FIGS. 1 and 2, there are shown two identical vehicles 10 having wheels 12 and being arranged to be driven in synchronism on a track or guideway 14 by digital command pulses transmitted over line 16 from a remote central control system 18. A suitable system for generating such command pulses is disclosed in copending application Ser. No. 882,422, filed Dec. 5, 1969 and assigned to the same assignee as this application. Each command pulse instructs each vehicle 10 to move a predetermined increment along guideway 14. Each vehicle 10 has a loop antenna 20 which is arranged to sense current pulses in line 16 and to transmit them to the vehicle's internal circuitry (to be discussed in greater detail below) to propel the vehicle. For simplicity in description of the invention only a small portion of the guideway 14 in a vehicle propulsion system has been shown. It will be understood that in fact such a system may employ one or more paths including switching points and stations from which the vehicles are launched and to which they may be directed.

The central control 18 includes a computer that contains a "software likeness" of the guideway—that is an electronic map containing complete information about the guideway, switching points, junction, stations, etc. As can be seen in FIG. 1, guideway 14 is divided into segments 22, the condition of each of which (i.e., whether or not a vehicle is currently located on that particular segment) may be sensed selectively—in a manner to be described in greater detail below—by central control 18 via lines 24. Allowable car locations 26 (each consisting of a plurality of segments 22), continuously circulate in synchronism around the guideway itself and are spaced apart by a minimum interval (which varies with certain parameters of the particular system), called the headway, $H_v$, which is defined as the back to front separation of adjacent allowable car locations.

As can be seen, each allowable car location has an effective length, $E_v$, which is greater than their car length, L, to provide for some allowable loss of synchronism.

Each of segments 22 has a detection loop (not shown) which is arranged to detect the presence of a vehicle on the segment when commanded by central control 18 and to signal the central control 18 over lines 24 if a vehicle is located thereon. Segments 22 in a group corresponding to a distance of $E_v$ plus $H_v$ includes a group of segments which are de-energized (A through E here) and a group which are energized to sense vehicle presence (F through I). Central control 18 is arranged to change the designation of the de-energized and sensing segments in the manner that the sensing segments move in synchronism with the location of the headway area, to examine the sensing segments in parallel, and to take appropriate action if a vehicle is located in any headway areas therein.

Track mark devices 28 are spaced at predetermined intervals (for example, every 50 feet) along guideway 14 and each vehicle 10 has a track mark detector 30 arranged to sense the marks 28 as the vehicle 10 passes them.

Referring now to FIG. 2, each vehicle 10 has its wheels 12 driven by the output shaft 32 of a hydraulic motor 34 the output of which is controlled by fluid flowing from a variable displacement pump 36 which is driven by a constant speed (e.g., 30 horsepower, 1,800 r.p.m.) electric motor 38 energized by a 240 volt a.c. supply (not shown). The displacement of pump 36 varies with the position of the pump yoke which is arranged to be controlled by the pump yoke control 40 operated by hydraulic servo valve 42. The position of the pump yoke is controlled by the setting of potentiometer 44 which is proportional to yoke position. Speed of rotation of hydraulic motor shaft 32 is monitored by tachometer 48 which produces an output voltage proportional to shaft rotation speed over line 50.

Preamplifier 52 receives a command velocity signal from the command and calibration circuitry (to be discussed below) over line 54, compares the command signal with the actual velocity signal from tachometer 48, and produces an output signal indicative of the difference therebetween on line 56. Amplifier 58 compares the difference between the signal on line 56 and the signal from potentiometer 44 on line 46 and, transduces the difference from a voltage to a current for application to servo valve 42 to change yoke position in a direction and amount sufficient to eliminate that difference.

Referring now to the command and calibration circuitry in FIG. 2, reversible counter 60 is arranged to be stepped by digital command pulses from central control 18. Its output, corresponding to the count therein, is applied over line 62 to digital-to-analog converter 64 which converts the counter output to an electrical signal representative thereof. The signal from converter 64 is not applied directly to pre-amplifier 52, however, since the pulse count in counter 60 may vary abruptly in a short time interval. The necessity for comfort of passengers in the vehicles requires that acceleration and jerk—the abruptness of a change in vehicle velocity—be limited to reasonable values. In addition, provision must be made to insure adequate torque is applied to yoke control 40 by servo valve 42 at low velocities at which the response of the servo is critical. Thus, additional circuitry is interposed between converter 64 and pre-amplifier 52. This circuitry includes variable gain inverting amplifier 66 which has a normal static d.c. gain of unity and is arranged to receive the output of converter 64 over line 68. Feedback loops 70 and 72 respectively having positive slope diferentiator 74 and negative slope differentiator 76, are provided on output line 78 of amplifier 66 and are arranged to control the gain of amplifier 66 in an inverse direction and thus limit acceleration. Thus, for increasing values of the derivative of the output voltage of amplifier 66, positive slope differentiator 74 is arranged to decrease the gain of amplifier 66 and for decreasing values of output from amplifier 66 negative slope differentiator 76 is arranged to increase the gain of amplifier 66. Differentiators 74 and 76 have non-linear gains and are further arranged to permit the output of amplifier 66 to remain unchanged when the requested changes in velocity are equal to or less than an acceptable maximum amount.

Low pass filter 80 receives the output of amplifier 66 and smooths out changes in the output signal, thus limiting jerk. Non-linear amplifier 82, having an output voltage which is approximately proportional to the square of the input voltage, amplifies the output of filter 80 and applies its output signal to pre-amplifier 52 in a manner to insure that at low velocities sufficient torque will be developed by servo valve 42 to operate yoke control 40.

Since each drive pulse transmitted from central control 18 to increment counter 60 is arranged to command the vehicle 10 to move one predetermined increment of distance forward, means are provided to decrement the count in counter 60 after the vehicle has moved the commanded distance. For this purpose, shaft position encoder 84 is provided and is arranged, in response the rotation of shaft 32 (which, when the circumference of wheels 12 is known, corresponds to a particular distance travelled by vehicle 10) to generate a digital pulse corresponding to each actual increment of distance travelled by vehicle 10 and to transmit that pulse over line 86 to auxiliary counter 88 and to the decrement input of counter 60 to reduce the count contained therein by one.

As the pulse signals from encoder 84 may be inaccurate due, for example, to tire wear or reduced air pressure, correction register 90 is provided to compare the setting of counter 88 with a predetermined setting equal to the number of increments between track marks 28. Each track mark is sensed by track mark detector 30 and the difference if such exists, is applied to counter 60 over line 92 or 94 to correct the count in counter 60 accordingly.

Checking circuitry is also provided to correct inaccuracies in reception of command pulses by the vehicle 10. A second auxiliary counter 96 counts via line 98 the command pulses that are applied to counter 60 from central control 18. Central control 18 periodically transmits a "base 0" mark over line 100 to gate the count in counter 96 to correction register 102 which holds a preset number (corresponding to the number of increments (stepping pulses) between "base zero" marks) and to transmit any difference therebetween to modify the count in counter 60 accordingly.

In operation, a vehicle 10 is launched onto a vacant location 26 which is moving at the synchronous speed of the system as determined by the rate of pulses generated by central control 18. Counter 60 responds to those pulses and its setting is applied to converter 64 over line 62. Converter 64 transmits over line 68 a voltage signal corresponding to the digital signal received, through variable gain amplifier 66 and low pass filter 80, which limit acceleration and jerk respectively to non-linear amplifier 82. The amplified signal is transmitted over line 54 to pre-amplifier 52. Pre-amplifier 52 compares the command signal on line 54 with the shaft velocity signal which is transmitted by tachometer 48 over line 50 and produces an output over line 56 to amplifier 58 which has a current output, corresponding to the difference between the voltage applied by pre-amplifier 52 and the voltage of yoke position potentiometer 44. That current output energizes servo valve 42 to drive pump yoke control 40 to change the displacement of pump 36, as necessary, and pump 36 applies hydraulic fluid to motor 34 to rotate shaft 32 at a speed corresponding to yoke displacement, thus driving the wheels 12 of the vehicle 10. As shaft 32 rotates, encoder 84 transmits a pulse corresponding to each incremental distance which vehicle 10 has apparently travelled to counters 60 and 88. In a preferred embodiment pulses are transmitted serially by central control 18, the rate of transmission thereof determining the synchronous speed of the system. Control data may also be transmitted in blocks. As a practical matter, transmission errors may inhere in the system, and some provision for checking the data blocks received by vehicle 10 may be desirable. For this purpose vehicle 10 may include register storage (capable, for example, of storing three or five data blocks) and comparison circuitry interposed between sensor antenna 20 and counter 60. With these provisions the same data block may be serially transmitted a number of times (three or five in the present example) in each transmission cycle, and the several stored blocks compared by the comparison circuitry which may be arranged to choose that value which appears the majority of times (two or three in the present example) as the correct word for transmission to counter 60.

As will be apparent, the speed of shaft 32 increases until the rate of pulses transmitted by encoder 84 equals the rate of pulses received from central control 18 by counter 60 at which time the count in counter 60 stabilizes and vehicle velocity remains constant until the command pulse rate changes. As the displacement of pump 36, and therefore the velocity of the vehicle, increases, the output voltage of potentiometer 44 increases until the voltage on line 46 equals the output voltage of pre-amplifier 52. When this equality occurs, the output of amplifier 58 becomes zero, the servo and yoke control 40 become de-energized, and the displacement of pump 36 and the speeds of motor 34, shaft 32 and wheels 12 remain constant until amplifier 58 again has an output.

Although servo valve 42 and yoke control 40 maintain the proper displacement of pump 36 to a high degree of accuracy, a number of factors, such as changes in temperature or of the density of the fluid driving motor 34, may cause the speed of shaft 32 to fluctuate somewhat. Tachometer 48 detects these fluctuations for correction purposes. For example, when the output of amplifier 58 has become zero, the constant speed of shaft 32 may be slightly more or less than the speed actually commanded by computer 18. Tachometer 48 has an output voltage over line 50 which is representative of the actual speed of shaft 32 and that output voltage is compared by amplifier 52 with the signal on line 54 which is representative of commanded speed. If there is a difference between the two voltages, amplifier 52 has an output signal which changes yoke position and displacement of pump 36 in the appropriate direction to correct the speed and continues to have an output until the actual speed becomes equal to the commanded speed.

The digital output of shaft position encoder 84, which represents the apparent distance which vehicle 10 has travelled, is counted in auxiliary counter 88, in addition to being used to decrement counter 60. Correction circuitry 90 compares the count in counter 88 with a count gated by track mark detector 30 which corresponds to the actual distance which vehicle 10 has travelled, and if there is a difference between the counts—for example, if the count from encoder 84 is too high because wheel circumference has decreased with wear or loss of air—increments the count in counter 60 accordingly. In order to eliminate errors in the count transmitted to counter 60 by central control 18, the pulses from central control 18 are counted by auxiliary counter 96 and the base zero mark similarly gates an appropriate correction to counter 60 as necessary.

If one of the correction units of the system fails, the other still continues to operate to correct the setting of counter 60. Should the vehicle nonetheless fall out of synchronism so much that it enters the headway area $H_v$ before the faulty correction system can be repaired, its presence above a sensing segment is detected and a signal transmitted over lines 24 to central control 18 which takes appropriate corrective action.

Thus, the invention provides a vehicle control system which is self-correcting for departures in velocity and position from the velocity and positions of allowable locations of other vehicles in the synchronous stream. Hydraulic motors are well suited for use in propelling such vehicles since they are sufficiently powerful to drive the vehicles, are highly responsive to relatively small changes in inputs, are non-polluting and are less expensive than other drive systems of comparable response. The system is readily adaptable for use in a comprehensive transportation system which may be controlled automatically by a single computer. Additional details of a vehicle incorporating this system may be had with reference to copending patent application Ser. No. 41,954, filed June 1, 1970 in the names of Taylor et al. and entitled "Transportation System" and assigned to the same assignee as this application.

While a particular embodiment of the invention has been shown and described, modifications thereof will occur to those skilled in the art and therefore it is not intended that the invention be limited to the disclosed embodiment or to details thereof and departures may be made therefrom within the spirit and scope of the invention.

What is claimed is:

1. A vehicle for use in a transportation system having a track defining a predetermined vehicle path, a series of track marks spaced along said track, and a central control for transmitting digital control data for controlling the movement of said vehicle along said track and periodic check signals, said vehicle comprising propelling means for propelling said vehicle along said track,
   a digital-to-analog converter for producing propulsion control signals for application to said propelling means,
   means for applying said digital control data to said converter, feedback means for generating signals representative of vehicle movement and
   correction means responsive to said vehicle movement signals, said digital control data signals, said track marks and said check signals for applying correction signals to said converter for applying modified digital signals as a function of the correlation between said actual vehicle movement signals and said digital control data and between said track marks and said check signals.

2. A vehicle according to claim 1 and further including transducing means for modifying said electrical propulsion control signals to limit the degree of response of said propelling means thereto.

3. A vehicle according to claim 1 wherein said means for applying digital signals to said converter includes an up-down counter arranged to receive signals from said central control for application to said converter and said feedback means comprises
   an encoder for encoding changes of position of said propelling means to digital signals representative of changes of vehicle position,
   said up-down counter being arranged to subtract said signals representative of changes of vehicle position from digital signals applied from said remote command means to produce a difference signal for application to said converter.

4. A vehicle according to claim 3 further comprising detecting means for detecting said track marks and for generating signals representative thereof,
   said correction means further comprising comparison circuitry for comparing said signals from said encoder to said signals from said detecting means and generating a signal representative of the difference therebetween for application to said counter in the manner to bring said signal from said encoder into correspondence with said signal from said detecting means.

5. A vehicle according to claim 4 wherein said correction means further comprises second comparison circuitry for comparing the number of digital signals from said central control actually received by said counter with the number of actual vehicle movement signals and for generating a digital signal representative of the difference therebetween for application to said counter to bring the count in said counter into conformity with the number of signals transmitted by said central control.

6. A vehicle according to claim 1 wherein said feedback means for modifying electrical signals comprises
   a transducer for producing electrical signals representative of changes of position of said propelling means and said correction means includes
   comparison circuitry for comparing said electrical propulsion control signals produced by said digital-to-analog converter and said electrical signals produced by said transducer and for producing an electrical signal representative of the difference therebetween for bringing said signals produced by said transducer into conformity with said signals produced by said digital-to-analog converter.

7. The vehicle as claimed in claim 2 wherein said transducing means includes an amplifier having a feedback loop and a differentiator connected in said feedback loop for controlling the gain of said amplifier.

8. The vehicle as claimed in claim 7 wherein said transducing means further includes a low pass filter responsive to the output of said amplifier for smoothing the output signal produced by said amplifier and thus limiting jerk in the operation of said propelling means.

9. A transportation system comprising a track defining a predetermined vehicle path, a series of track marks spaced along said track, a plurality of vehicles for movement along said track, and a central control for transmitting digital control data for controlling the movement of said vehicles along said track and periodic check signals, each said vehicle including means for producing vehicle propulsion signals in response to said digital control data, drive means responsive to said propulsion signals for causing said vehicle to move along said track, feedback means for generating signals representative of vehicle movement to modify the signals produced by said propulsion signal producing means, and correction means responsive to said vehicle movement signals, and said digital control data signals, said track marks and said check signals for applying correction signals to said propulsion signal producing means as a function of the correlation between said vehicle movement signals and said digital control data and between said track marks and said check signals.

10. The system as claimed in claim 9 wherein said propulsion signal producing means includes a reversible counter, and a digital-to-analog converter responsive to the contents of said reversible counter, said drive means includes a drive motor for driving said vehicle and transducing means responsive to said converter for controlling said drive motor.

11. The system as claimed in claim 10 wherein said transducing means includes an amplifier having a feedback loop and a differentiator connected in said feedback loop for controlling the gain of said amplifier.

12. The system as claimed in claim 11 wherein said transducing means further includes a low pass filter responsive to the output of said amplifier for smoothing the output signal produced by said amplifier and thus limiting jerk in the operation of said propelling means.

13. The system as claimed in claim 9 and further including transducing means connected between said propulsion signal producing means and said drive means for modifying the rate of change of propulsion signals applied to said drive means.

14. The system as claimed in claim 9 wherein said correction means includes detecting means for detecting said track marks and for generating signals representative thereof, and comparison circuitry for comparing said signals from said detecting means and said check signals and generating a signal representative of the difference therebetween for application to said propulsion signal producing means in the manner to bring the actual vehicle position into agreement with the position specified by said central control.

15. The system as claimed in claim 14 and further including second comparison circuitry for comparing the number of digital signals from said central control actually received by said propulsion signal producing means with the number of vehicle movement signals and for generating a digital signal representative of the difference therebetween for application to said propulsion signal producing means to bring the count therein into conformity with the number of signals transmitted by said central control.

* * * * *